United States Patent [19]
Marsan

[11] 3,897,781
[45] Aug. 5, 1975

[54] OSTOMY DEVICES
[75] Inventor: Elayne R. Marsan, Minocqua, Wis.
[73] Assignee: Marsan Manufacturing Co., Inc., Wausau, Wis.
[22] Filed: Sept. 28, 1973
[21] Appl. No.: 401,696

[52] U.S. Cl. .................................... 128/283
[51] Int. Cl. .................................... A61f 5/44
[58] Field of Search .................... 128/283, 295

[56] References Cited
UNITED STATES PATENTS

| | | | |
|---|---|---|---|
| 3,083,704 | 4/1963 | Swearingen | 128/1 |
| 3,398,744 | 8/1968 | Hooper | 128/283 |
| 3,439,679 | 4/1969 | Doolittle | 128/283 |
| 3,483,868 | 12/1969 | Marson | 128/283 |
| 3,667,469 | 6/1972 | Marsan | 128/283 |

Primary Examiner—Richard A. Gaudet
Assistant Examiner—Henry S. Layton
Attorney, Agent, or Firm—Merriam, Marshall, Shapiro & Klose

[57] ABSTRACT

Disclosed are ostomy appliances including a circular or oblong-shaped gasket with a tubular annular flange extending from a central aperture therein, the flange being dimensioned in such a manner as to reduce substantially the accumulation of liquid waste materials on the inside lower surface of the flange and thereby to diminish the likelihood of deterioration of a sealing means, typically in the form of a sealing ring, disposed between the gasket and its user and to avoid irritation of the exposed tissue of the user. Also disclosed are ostomy appliance combinations including smoothed surfaces on the flange circumferential edge portions, corrugated front and/or back gasket surfaces, and/or protective film materials adapted to provide a snug fitting stoma-receiving passageway therein.

2 Claims, 4 Drawing Figures

OSTOMY DEVICES

BACKGROUND OF THE INVENTION

The present invention relates generally to ostomy appliances of the type used by colostomy and ileostomy patients, and more particularly to an ostomy appliance for use with a sealing ring and including a rigid base gasket having an annular flange extending from a central aperture therein.

Prior ostomy appliances, such as those shown, for example, in U.S. Pat. No. 3,483,868, have employed an annular flange disposed around the central aperture of a rigid gasket about which expendable medical drainage pouches may be disposed and supported thereby. These conventional appliances have been sealingly positioned at the abdominal wall of the user with a sealing ring and maintained in place with elastic belts and the like. Surgical cements have provided an alternative means for attaching appliances, especially ileostomy applicances, to the abdominal wall of the patient.

Prior ostomy appliance gaskets having an annular flange of uniform height have tended to permit liquid gastric tract waste material discharges to accumulate at the lower lip portion thereof. Enzymes present in these discharges have an excoriating effect on the skin area surrounding the stoma and also contribute to rapid deterioration of sealing rings.

Another problem associated with ostomy appliances of the prior art has been the fact that the edge portions of annular flanges have had relatively sharp corners which have had a tendency to irritate and injure the nerve-insensitive, but very easily abraded, stoma.

A further problem associated with prior appliances has been the difficulty in obtaining a liquid-tight seal between the back surface of the ostomy appliance and the sealing ring. Similarly problematic in the use of prior appliances has been the fact that the water-soluble sealing ring and skin surrounding the stoma was often exposed directly to the deteriorating effects of the liquid waste materials.

Yet another problem associated with prior art ostomy devices has been the excessive time and effort required to mount a double sided gasket between an expendable drainage pouch and a base gasket.

A still further problem associated with prior ostomy appliances has been the fact that ostomy appliances of the prior art were not readily adaptable to all stoma sizes, making it necessary for hospitals to stock appliances for each individual stoma size.

SUMMARY OF THE INVENTION

Ostomy appliances of the present invention include a rigid base gasket, preferably manufactured from high density polyethylene, the front and back surfaces of which are substantially planar. Extending from the base gasket at its central aperture is a tubular annular flange, the walls of which are dimensioned such that, when in position for use, the top portion thereof extends outwardly from the gasket to a greater height than the bottom portion. The top portion of the tubular annular flange extends to a height sufficient to permit it to support the weight of an expendable medical drainage pouch, while the bottom portion of the tubular annular flange extends outwardly to a height insufficient to permit substantial accumulation of liquid waste material on the inner surface of the bottom portion, thereby effectively alleviating the corrosive effect of liquid waste material on both the skin area surrounding the stoma and the sealing ring.

A sealing ring is ordinarily positioned intermediate the user's abdominal wall and the gasket to prevent leakage of liquid waste material discharged at the stoma.

It is also contemplated that appliances of the present invention may include a protective film, having a cross-cut, stoma-receiving opening of variable size therein, disposed intermediate the sealing ring and the gasket to diminish the corrosive effects of waste materials on the sealing ring and the skin surrounding the stoma. Appliances in accordance with the present invention may further include corrugated surfaces on the generally planar front and back sides of the gasket. Lastly, appliances of the invention may include smooth and rounded circumferential edge portions on their central annular flanges.

The inside circumferential edges of the annular flange of an ostomy appliance of the present invention may preferably be smooth and rounded to protect the nerve-insensitive, but nevertheless very delicate, stoma tissue from accidental cuts or abrasive pressure which can lead to infection. Further, corrugations, preferably in the form of annular or spiral grooves on the front surface of the base gasket may be provided to increase its surface area for better and more completely leakproof adhesion of expendable medical drainage pouches. Also, the back surface of the base gasket may have similar corrugations, permitting better adhesion of the sealing ring and substantially preventing a shifting of the appliance in relation to the location of the stoma.

Appliances in accordance with the present invention may be provided with a layer of protective film disposed between the sealing ring and base gasket to minimize the contact of liquid waste material with both the sealing ring and the skin surrounding the stoma. This protective film preferably has a cross-cut pattern in the center, creating a stoma-receiving passageway which provides a gentle, yet snug, fit around the stoma.

DETAILED DESCRIPTION OF THE DRAWING

Figure 1:
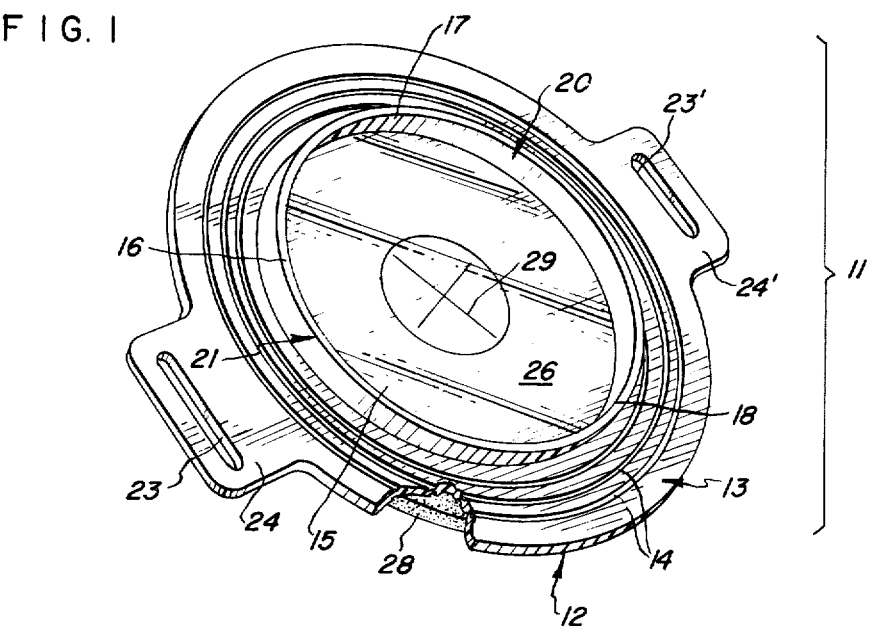
FIG. 1 is a perspective front view of an embodiment of an appliance of the present invention with a portion cut away.

Referring to FIG. 1, which shows a perspective front view of an embodiment of the present invention, the ostomy appliance, shown generally at 11, has a base gasket 12 with front planar surface 13 on which corrugations 14 in the form of annular grooves are located. It is contemplated that many other forms of corrugations, such as spirals, annular ridges or radiating strips or grooves, may be employed to accomplish the function of increasing the surface area of the planar surfaces of the base gasket to provide thereby for a better sealing fit against any material which is to be adhered to the surface. Tubular flange 16 is annularly disposed about the central aperture 15 of base gasket 12 and is dimensioned such that tubular flange 16 extends to a greater height and further outwardly from base gasket 12 at its top portion 17 than at its bottom portion 18. Tubular flange 16 has an inner surface 20 and an outer surface 21.

In the embodiment of FIG. 1 the support means employed in holding ostomy appliance 11 in position on the abdominal wall of the user include diametrically opposing slots 23, 23' in ear-like projections 24, 24' respectively, in which buckles on an ostomy belt fitting around the abdomen of the user may be inserted.

A protective film 26 which may be sealed to the planar back surface 27 (see FIG. 2) of base basket 12 or to sealing ring 28 is disposed across central aperature 15 of base gasket 12. Protective film 26 is preferably provided with a passageway such as cross-cut opening 29 to receive the stoma of user. Such a cross-cut style of opening has the advantage over the prior cut-out type stoma openings that it is much less likely to injure the sensitive stoma tissues. A further advantage associated with the use of ostomy appliances of the present invention having such a feature is the fact that a hospital or supply house need only stock two gasket sizes (1½ inch and 3 inch) to serve all ostomy patients regardless of the size of the particular stoma.

Figure 2:
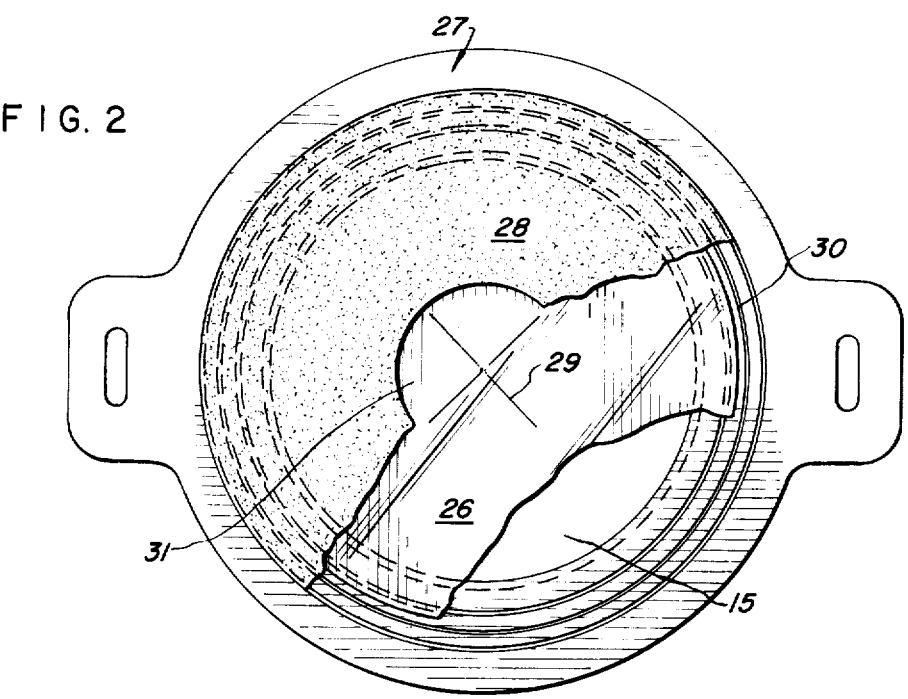
FIG. 2 is a rear view of the embodiment of FIG. 1 with a portion of the sealing ring cut away.

Referring to FIG. 2, which shows the back side of the ostomy appliance of FIG. 1, which side fits against the abdominal wall of the user, base gasket 12 with planar back surface 27 is provided with corrugations 30 in the form of annular grooves. The purpose of such corrugations is to provide a better surface more securely and sealingly to hold sealing ring 28 to back surface 27. Sealing ring 28 has central opening 31 therein to receive the stoma of the user, which then projects through cross-cut opening 29 in protective film 26 to empty into an expendable drainage pouch.

Ostomy appliances of the invention are applied to the abdominal wall of the user by first adhesively securing a sealing ring around the stoma. The base gasket portion of the appliance is then firmly pressed onto the ring with corrugations on the planar back surface of the base gasket engaging the gelatinous sealing ring to hold the gasket and sealing ring firmly together and form a liquid-tight seal between the abdominal wall and the base gasket. During such application the stoma and its immediate surrounding area are in full view of the patient at all times, which assists the patient in the proper placement of the ostomy appliance in relation to the stoma.

A expendable drainage pouch may then be attached to the front of the base gasket by disposing said pouch about tubular annular flange 16. Attachment of the pouch may be accomplished by direct application to the base gasket with adhesives or by the use of a gasket, preferably manufactured from paper, to which the pouch has been preferably heat sealed. The combination of gasket and pouch may either be held in place by means of the same buckles on the ostomy belt which secures base gasket 12 or by means of adhesive materials placed on the paper gasket or on the base gasket for the purpose of forming a seal between the paper gasket and base gasket 12. Thus, the drainage pouch may be easily removed for cleaning and/or replacement or irrigation of the stoma without removing base gasket 12 from the abdominal wall.

The tubular annular flange structure of the present invention resists pull on the top of the drainage pouch which could result in a loosening of the drainage pouch from front planar surface 13 of base gasket 12. The patient, thus, can have greater confidence and assurance in the seal created by use of ostomy appliances in accordance with the present invention than was the case with prior art ostomy appliances.

Protective film 26, which shields sealing ring 28 from the deteriorating effects of liquid waste material, is preferably 0.001–0.003 in thickness and is manufactured from a film-like material such as polyethylene, polypropylene, or polyvinylidine chloride.

Sealing ring 28 is preferably manufactured from a chemically neutral, soft, viscous, gelatinous material, such as karaya gum, or such synthetics as acrylomitic or terpolymer adhesives.

Figure 3:
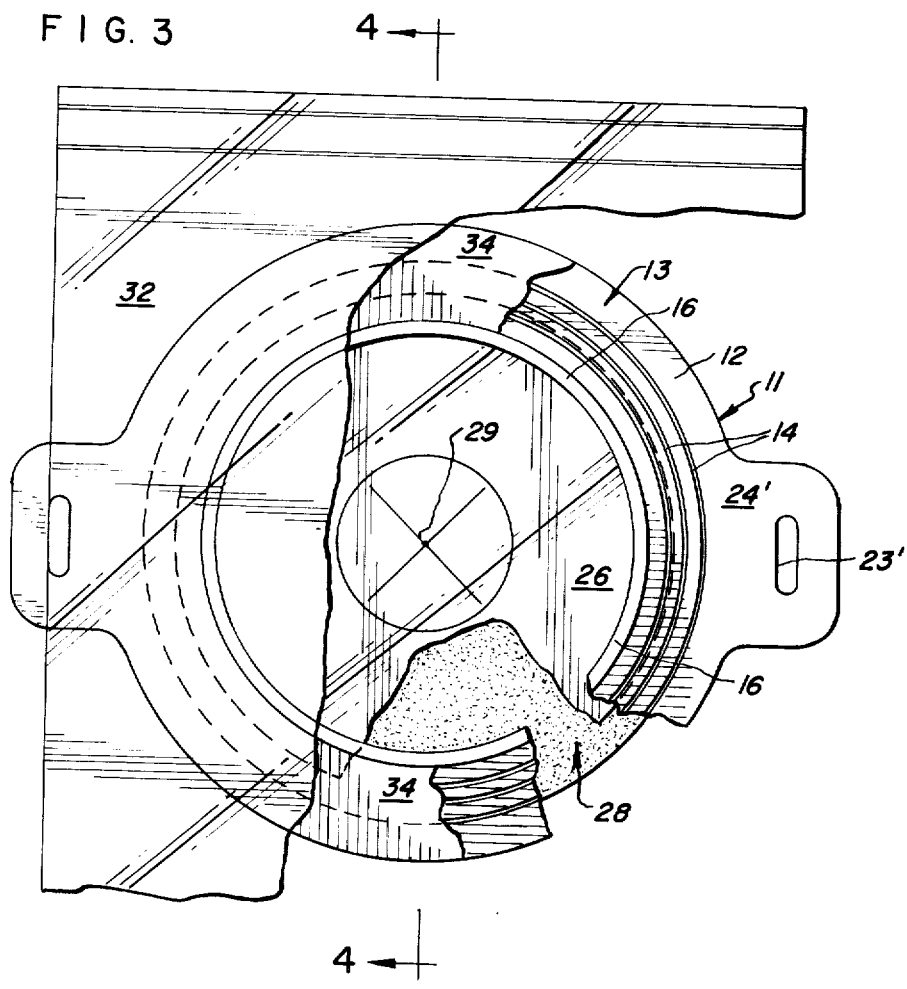
FIG. 3 is a frontal view of an ostomy appliance of the present invention showing an expendable drainage pouch installed on the tubular flange thereof.
Figure 4:
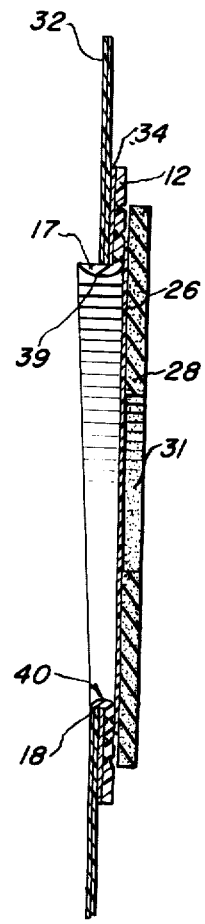
FIG. 4 is a view taken along line 4—4 of FIG. 3.

Referring to FIGS. 3 and 4 which show front and side views of a number of aspects of appliances of the present invention, ostomy appliance 11 is shown connected to an expendable drainage pouch 32. The means by which expendable drainage pouch 32 may be attached to ostomy appliance 11 are also shown in detail. Gasket 34, which provides a rigid connection and a snug fit between expendable drainage pouch 32 and the front planar surface of annular flange 16, is preferably heat sealed to the front surface of expendable drainage pouch 32. There may be disposed between gasket 34 and planar front surface 13 of base gasket 12 an adhesive material which may form a liquid tight seal between expendable drainage pouch 32 and ostomy appliance 11.

In a preferred embodiment, gasket 34 has preferably a pressure sensitive adhesive on the surface thereof, which is protected by release paper (not shown) until it, along with the expendable drainage pouch to which it has been heat sealed, is ready to be mounted on gasket 12. This embodiment is faster, easier, and more economical to apply and use than were the devices of the prior art since prior art devices have utilized an additional gasket between gasket 34 and base gasket 12. The adhesive material previously had been applied to both sides of the additional prior art gasket, rather than to the surface of gasket 34. Corrugations 14 located on planar front surface 13 of base gasket 12 help to provide a gripping surface against which gasket 34 may most effectively adhere. In an alternative embodiment base gasket 12 has a pressure sensitive adhesive applied to front surface 13 thereof which is protected by a layer of release paper until use, thereby serving the function of assuring a liquid tight seal between gasket 34 and base gasket 12.

FIG. 4 illustrates a level tapered embodiment of the present invention. Top portion 17 extends further outwardly from base gasket 12 than does bottom portion 18. Although the embodiment illustrated in FIG. 4 has an evenly tapered cross-section, it is contemplated that ostomy appliances in accordance with the present invention may have other shaped cross-sections the only requirements being that bottom portion 18 which is engageable with expendable drainage pouch 32 extend only slightly therebeyond and top portion 17 extend beyond expendable drainage pouch 32 to a height greater than bottom portion 18 to support the weight of expendable drainage pouch 32 thereon.

Also illustrated in FIG. 4 are smooth top and bottom surfaces 39, 40 respectively, formed at the periphery of aperture 15 and extending from the back planar surface 27 of gasket 12 toward and including inner surface 20 of tubular flange 16, which smooth surfaces diminish the likelihood of damage to the stoma tissue as a result of its contact with base gasket 12.

The foregoing detailed description has been given for clearness of understanding only and no unnecessary limitations should be understood therefrom, as modifications will be obvious to those skilled in the art.

What is claimed is:

1. An ostomy appliance for use with an expendable drainage pouch, said appliance comprising:
   a base gasket having substantially planar front and back surfaces including,
   a centrally disposed aperture,
   means for orienting and supporting an expendable pouch on said gasket planar front surface about said aperture, said orienting and supporting means including,
   a tubular flange, having operative top and bottom portions as well as inner and outer surfaces, annularly disposed about said aperture on said gasket planar front surface, the operative top portion of said flange being dimensioned to extend outwardly from said surface a distance sufficient to permit orientation of said pouch about said aperture and to support said pouch upon the outer surface thereof, the operative bottom portion of said flange being dimensioned to extend outwardly from said surface a lesser distance then said top portion, said lesser distance being sufficient to permit orientation of said pouch about said aperture and insufficient to permit substantial accumulation of waste material on the inner surface thereof, the distance of outward extension of said tubular flange from said gasket planar front surface diminishing uniformly from top to bottom portions; and
   means for mounting said base gasket with said back surface adjacent the abdominal wall of the user.

2. An ostomy appliance as set forth in claim 1 including means for diminishing the liklihood of damage to stoma tissue of the user, said means comprising a smoothly rounded surface formed in said gasket at the periphery of said aperture.

* * * * *